United States Patent Office 2,845,415
Patented July 29, 1958

2,845,415

ERYTHROMYCIN ISETHIONATE

Anthony F. De Rose, Chicago, Ill., assignor to Abbott Laboratories, North Chicago, Ill., a corporation of Illinois No Drawing. Application August 13, 1953
Serial No. 374,136

3 Claims. (Cl. 260—210)

This invention relates to aqueous soluble salts of the antibiotic called erythromycin and to a process for preparing such salts. The application also relates to an injectable aqueous solution containing the soluble erythromycin salts of this invention.

Erthythromycin is an antibiotic which is produced by a strain of *Streptomyces erythreus* which was isolated from a soil sample collected from the Philippine Islands. The antibotic shows rather broad activity against bacteria and certain other microorganisms. It is a crystalline antibiotic having a postulated emperical chemical formula of $C_{39}H_{73-75}NO_{13}$ and a basic nature, and is soluble to the extent of about 2 to 4 mg./ml. in water. It is soluble in a number of organic solvents. It has a melting point of about 130° to 135° C. and an optical rotation $(\alpha)_D^{25}$ of about $-78$. Considerable data on the identification of the antibiotic is contained in Antibiotics and Chemotherapy, vol. 2, No. 6, page 281 (June 1952).

It is recognized that erythromycin is a very useful drug and that it would be desirable to administer the drug by injection. The erythromycin base is quite insoluble in water, however, and it can not, therefore, be injected intravenously for any practical purpose. Therefore, it is one of the objects of this invention to prepare a salt of erythromycin which will be soluble in aqueous medium in therapeutically desirable concentrations. The instability of solutions of erythromycin base in water is well known and even the small amount of erythromycin base which will dissolve in water loses its potency in a short time. It is another object of this invention to prepare a salt of erythromycin which will have high erythromycin activity in aqueous solution and will remain stable for a satisfactory period of time.

According to the invention, there is now provided a soluble salt of erythromycin which is the reaction product of erythromycin with isethionic acid. Such a reaction product has been found to have a solubility in water of about 115 mg./cc. and an erythromycin activity of about 720 units/mg. The structural chemical formula for erythromycin is extremely complex and has not been identified at the present time. Hence, it is impossible to characterize the reaction product by describing it in the form of a chemical formula except as

HO—CH$_2$—CH$_2$—SO$_2$—OE where E represents the erythromycin group. Nevertheless, certain things are known about the reaction product which clearly identify it and are capable of distinguishing it from other materials.

The following examples are presented in order to teach the details of the invention more clearly, but are not intended in any way to be a limitation on the invention. The parts are by weight unless otherwise specified.

*Example I*

A solution of erythromycin free base is prepared by dissolving about 7.31 gms. of erythromycin in about 20 ml. methanol. An equimolecular quantity of 1.3 g. of isethionic acid (hydroxyethylsulfonic acid) is dissolved in about 2 ml. of methanol and added slowly to the erythromycin solution. A clear solution results from this mixing. A salt is obtained by evaporating the methanol solvent and the yield of erythromycin isethionate is approximately quantitative.

The crystalline reaction product obtained in this manner is a white crystalline substance having the approximate emperical chemical formula $C_{41}H_{79-81}NO_{17}$. It is soluble in water at room temperature (25° C.) in the amount of 115 mg./ml. by total solids determination or in the amount of 82,000 u./ml. by microbiological assay. The reaction product melts at about 163° C.–165° C. as determined on the Fisher-Johns Block. The material has a potency of about 720 units/ml. against *B. subtilis*. The chemical analysis corresponds with the calculated chemical analysis as follows:

Calc.: C, 55–55.3%; H, 8.95–9.15%; N, 1.57%; S, 3.60%. Found: C, 54.12%; H, 8.90%; N, 1.51%; S, 3.40%.

Erythromycin isethionate prepared according to the preceding example is soluble in aqueous media such as distilled water and dextrose solution. Hence, any of the common non-ionic parenteral media may be used to solubilize the salt prior to injection. The reaction product is soluble in aqueous media in large enough concentrations to provide a therapeutically effective dose of erythromycin in a small volume of the aqueous media.

For example, the reaction product can be worked up into a pharmaceutical preparation by sterilizing the crystalline reaction product and placing a calculated amount of it into a sterile vial. The amount should be calculated to give a certain desired dosage per cc. of reconstituted solution when an aqueous medium is added. In the dry form the erythromycin isethionate salt will retain its activity for an indefinite period. When it is desired to inject the erythromycin isethionate a predetermined quantity of sterile aqueous media is inserted into the vial, as through the use of a syringe and needle. The vial is shaken until a reconstituted solution is obtained and a portion of this solution is withdrawn from the vial into a syringe and may then be injected intravenously, subcutaneously or intramuscularly in the usual manner. It will be recognized that the number of units of erythromycin activity in a reconstituted solution can be adjusted at will up to the limit of the solubility of the salt in the aqueous media.

*Example II*

The procedure outlined in Example I is repeated using approximately equimolecular quantities of erythromycin base and isethionic acid in methanol solvent. When a clear solution of the reaction product has resulted from mixing the ingredients, the reaction product can be crystallized from the methanol solution by adding a suitable organic solvent, such as diethyl ether to the methanol solution. The crystalline reaction product obtained in this manner has the same properties as outlined for the material illustrated in Example I.

*Example III*

Equimolar quantities of the sodium salt of isethionic acid and erythromycin hydrochloride are reacted in a double decomposition with the formation of erythromycin isethionate and sodium chloride. After suitable separation of the two salts the erythromycin isethionate is precipitated in the form of white crystals. The salt thus obtained has the same physical characteristics as the salt described in detail in Example I.

Others may practice the invention in any of the numerous ways which will be suggested to one skilled in the art. It is intended that such practice of the invention is to be included hereunder, provided it falls within the scope of the appended claims.

I claim:
1. The process of preparing new and useful pharmaceutical substances which comprises reacting together approximately equimolar proportions of erythromycin and isethionic acid at ordinary temperatures, and separating the resulting white crystalline, water-soluble solid erythromycin isethionate from the reaction mixture.

2. A physiologically active pharmaceutical preparation comprising an injectable aqueous solution of the product of claim 1.

3. The white, crystalline, water-soluble solid, erythromycin isethionate, obtained by the process of claim 1.

References Cited in the file of this patent

UNITED STATES PATENTS 2,653,899    Bunch et al. _____ Sept. 29, 1953

OTHER REFERENCES

Bresser: Pharmazeutische Zentralhalle für Deutschland, vol. 71, No. 29, July 17, 1930, pages 449 and 450.

Marini-Bettolo: Annales de la Asoc. Quimica y Farmacia del Uruguay, 1948, pages 3–17.